United States Patent [19]

Halvani

[11] Patent Number: 4,693,903

[45] Date of Patent: Sep. 15, 1987

[54] SESAME SEEDS HUSKING METHOD

[76] Inventor: Mohammed Halwani, 90, Av. des Champs-Elysées, 75008 Paris, France

[21] Appl. No.: 588,127

[22] Filed: Mar. 9, 1984

[30] Foreign Application Priority Data

Oct. 5, 1983 [FR] France ............................... 83 15864

[51] Int. Cl.[4] ............................................. A23L 1/36

[52] U.S. Cl. .................................... 426/456; 426/483; 99/518

[58] Field of Search ............... 426/629, 482, 483, 632, 426/455, 456, 479, 481; 99/518

[56] References Cited

U.S. PATENT DOCUMENTS

| | | | |
|---|---|---|---|
| 2,366,711 | 1/1945 | Earle | 99/518 |
| 2,393,975 | 2/1946 | Daman | 426/482 |
| 2,815,783 | 12/1957 | Horvilleur | 99/518 |
| 3,419,056 | 12/1968 | Girgus | 426/482 |
| 3,732,108 | 5/1973 | Eapen et al. | 426/481 |
| 3,744,399 | 8/1973 | Bonteil | 426/483 |

*Primary Examiner*—Raymond N. Jones
*Assistant Examiner*—Carolyn Paden

[57] ABSTRACT

A method for husking sesame seeds, characterized by the fact that the sesame seeds, previously freed from their impurities, are introduced into an attrition apparatus. By carrying out a simultaneous water and water steam injection in a proportion such that the seed water content is of about 15%, a swelling of the seeds occurs and at least 95% of the husk is removed. After sieving, the seeds thus almost husked are introducing in a drying assembly at the inlet of which they receive a complementary injection of water steam so that their water content be of the order of 14% to 18%. The drying operation is carried out for 1 hour to 2 hours at a temperature of 120° to 130° C., so that at the outlet of the drying apparatus the remaining husk is separated from the kernels and dessicated.

3 Claims, 4 Drawing Figures

SESAME SEEDS HUSKING METHOD

FIELD OF THE INVENTION

The object of the present invention is a method for husking and drying sesame seeds as well as a device for practicing said method.

BACKGROUND OF THE INVENTION

According to the method presently used for preparing sesame seeds, the seeds are first sieved in order to free them from their impurities, and then the seeds are left soaking for at least one hour in water; the water is then discharged and the moist seeds are left in the tanks so as to finish swelling. After having swelled, the seeds are husked by attrition, meaning that they are energetically stirred up and that the husks get loose by friction against each other. Said stirring is carried out in a round tank, when the seeds have reached a degree of moisture of 40–45%. Since the debris of husks and kernels remain stuck to each other and in order to separate them, said mixture has to be passed in a brine; the seeds have to be rinsed for freeing them from the salt contained throught the brine; the kernels float at the surface of the brine while the husk debris sink to the bottom, so that it is easy to collect them on the surface by means of a skimmer or by hand; finally, the kernels have to be rinsed in order to free them of the salt contained in the brine.

When using said method and for 500 kg of seed, the consumption of water is of 2000 liters, the consumption of salt of 200 kg, plus 5 hours to work for 5 persons. Moreover, a considerable energy has to be spent for the drying operation in order to eliminate the water absorbed by the seeds (40–45% by weight) and the husk debris are unusable for animal feed.

OBJECT AND SUMMARY OF THE INVENTION

The object of the present invention is a method and an installation for treating the same quantity of sesame seeds in 2 hours by one person only while using only 50 liters of water and no brine, the product never exceeding 15% of humidity, thereby making the drying operation easy to perform and the rejects usable directly as animal feed.

The method according to the invention consists in introducing the sesame seeds—previously freed from their impurities—in an attrition apparatus by carrying out a simultaneous water and water steam injection in a proportion such that the seed water content be of about 15%, thereby causing a first separation of the husks such that the husking be almost totally performed to 95% or more; then after sieving, introducing the seeds thus almost totally but not completely husked in a drying assembly at the inlet of which they receive a complementary injection of water steam so that their water content be between 14–18%, the drying being carried out for 1 hour 30 minutes to 2 hours at a temperature between 120° C. and 130° C. so that at the outlet of the drying apparatus, the remaining husks be completely dryed to a point that the separation from the kernels can be made by means of a ventilation sieve, the kernels being then ready for the production of sesame oil and/or for consumption.

The invention relates not only to the hereabove stated method, but also to an installation for carrying out the method.

BRIEF DESCRIPTION OF THE DRAWINGS

By way of a non limiting example and for making the understanding of the invention easy, reference is made to the accompanying drawings wherein.

DETAILED DESCRIPTION OF THE INVENTION

Figure 1:
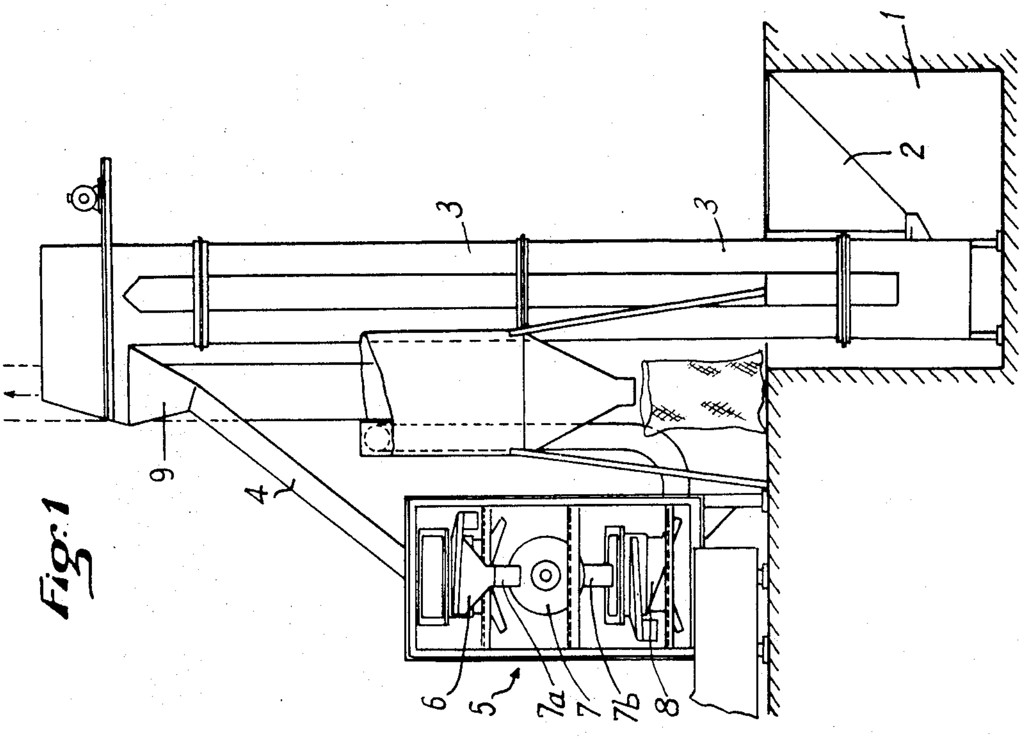
FIG. 1 is a side view of the pre-cleaning section (section I)

Reference being made to said figures, one sees that the installation is made of three sections, denoted by references I, II, III. In section I is carried out a mechanical cleaning; in section II is carried out a first husking, followed by a sieving operation eliminating the almost totality of the husks; in section III is carried out the drying after removal of the last husk remnants, as well as the last sieving operation.

Section I comprises a receiving pit 1 in which is placed a hopper 2 feeding a seed elevator 3 which discharges through a cyclone 9 into a chute 4 feeding a sorting assembly 5. Said sorting assembly 5 includes a first vibrating sieve 6, an attrition drum 7 and a second vibrating sieve 8. Drum 7 is preferably cylindrical and through which extends an axis fitted with radial arms, driven by a motor. The cylinder is arranged such that its axis be slightly inclined downwardly so that the seeds arrive at its highest end *7a* and proceed to its lowest end *7b* while being continuously stirred by the multiple radial arms carried by the axis. Said stirring frees the seeds from the impurities adhering to them. The seeds and impurities fall on a second vibrating sieve separating the seeds and impurities.

Figure 2:
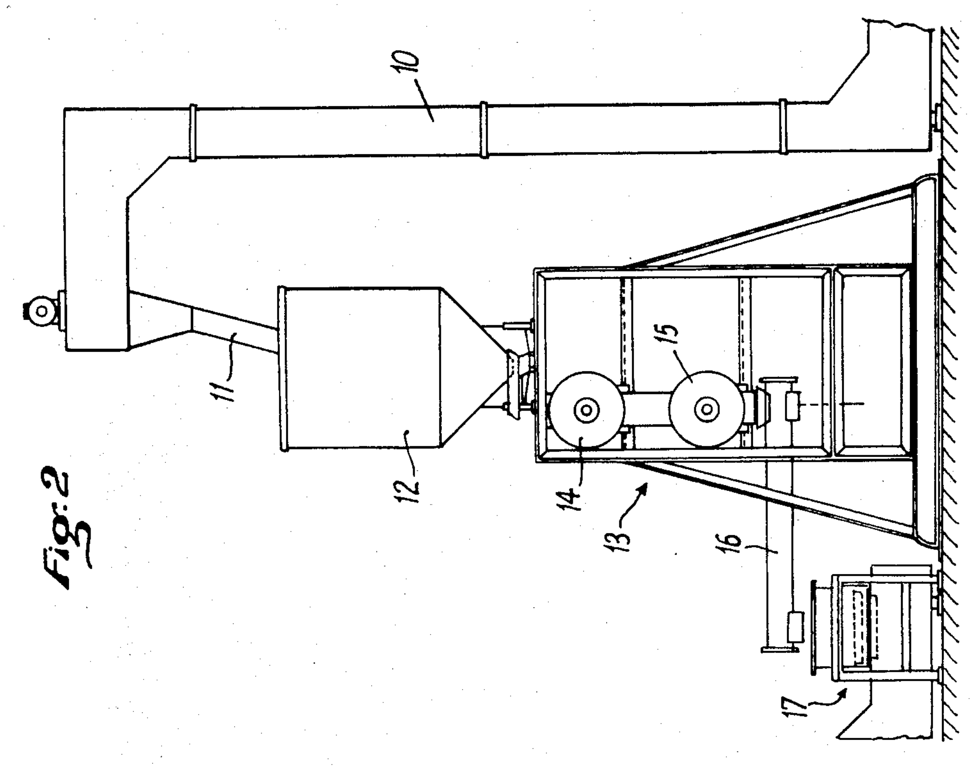
FIG. 2 is a side view of the husking and sieving section (section II)

The seeds are taken over by a bucket elevator 10 (FIG. 2, section II) and are discharged by a chute 11 into a metering hopper 12. In the example shown, the metering hopper 12 is set for delivering a flow rate of seeds of 500 kg per hour. The seed flow rate thus determined with precision is forwarded by gravity into a husking assembly 13.

Said assembly 13 includes two attrition drums 14 and 15 similar to drum 7.

However, the first drum 14 is provided at its input with water and water stream injection means. Said injectors are set for injecting to 500 kg of sesame seeds from 40 to 60 liters of water (preferably 50) and from 15 to 20 kg of water steam (preferably 20). In any case, the humidity content of the seeds should not exceed 15% at the outlet of drum 14. Said water and said steam are incorporated to the seed mass by stirring and the simultaneous action of steam and water causes the seeds to swell and the husking operation to start under the friction effect of the seeds against each other. The seeds then pass (under gravity) to the second drum 15 which is identical to drum 14 except that it does not include water or water steam injection means.

The action of drum 15 is only a stirring action of the seeds so that said seeds rub against each other. The husking started in drum 14 goes on and is carried out up to 95% and more.

The seed and husk flow discharged from drum 15 is taken over by an endless screw conveyor or by a pneumatic elevator 16, and forwarded to a sorting assembly comprising a vibrating sieve 17 where the seeds and husks are separated. At this stage, the seed flow is formed of about 82% to 86% by weight of kernels and of 14% to 18% of husk. The sieve 17 eliminates about 90% of the husk so that at the oulet of sieve 17 there remains about 1.4% to 1.8% of husk in the seed flow.

Figure 3:
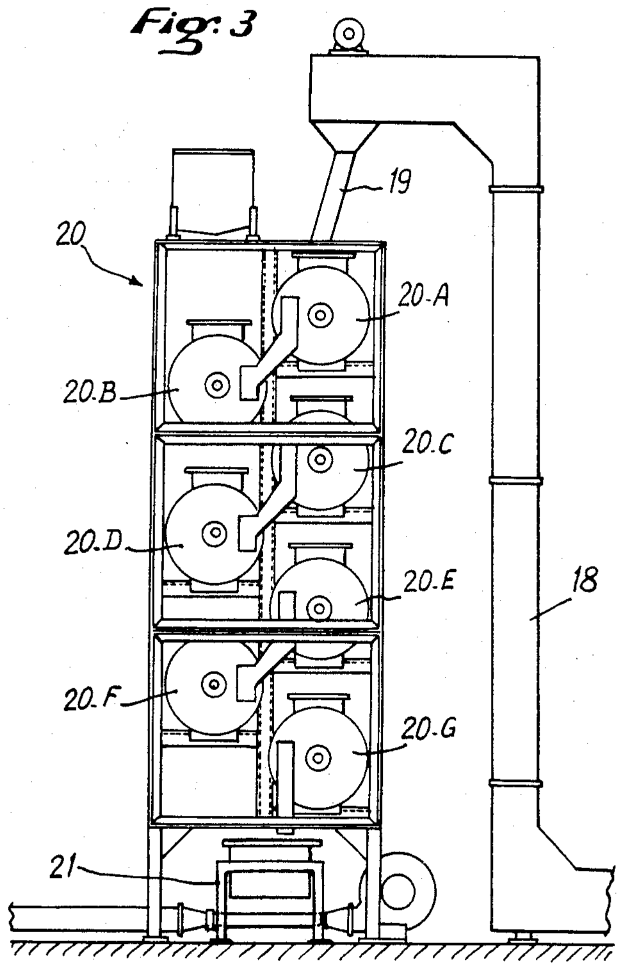
FIG. 3 is a side view of the cooking and final husking section (section III)
Figure 4:
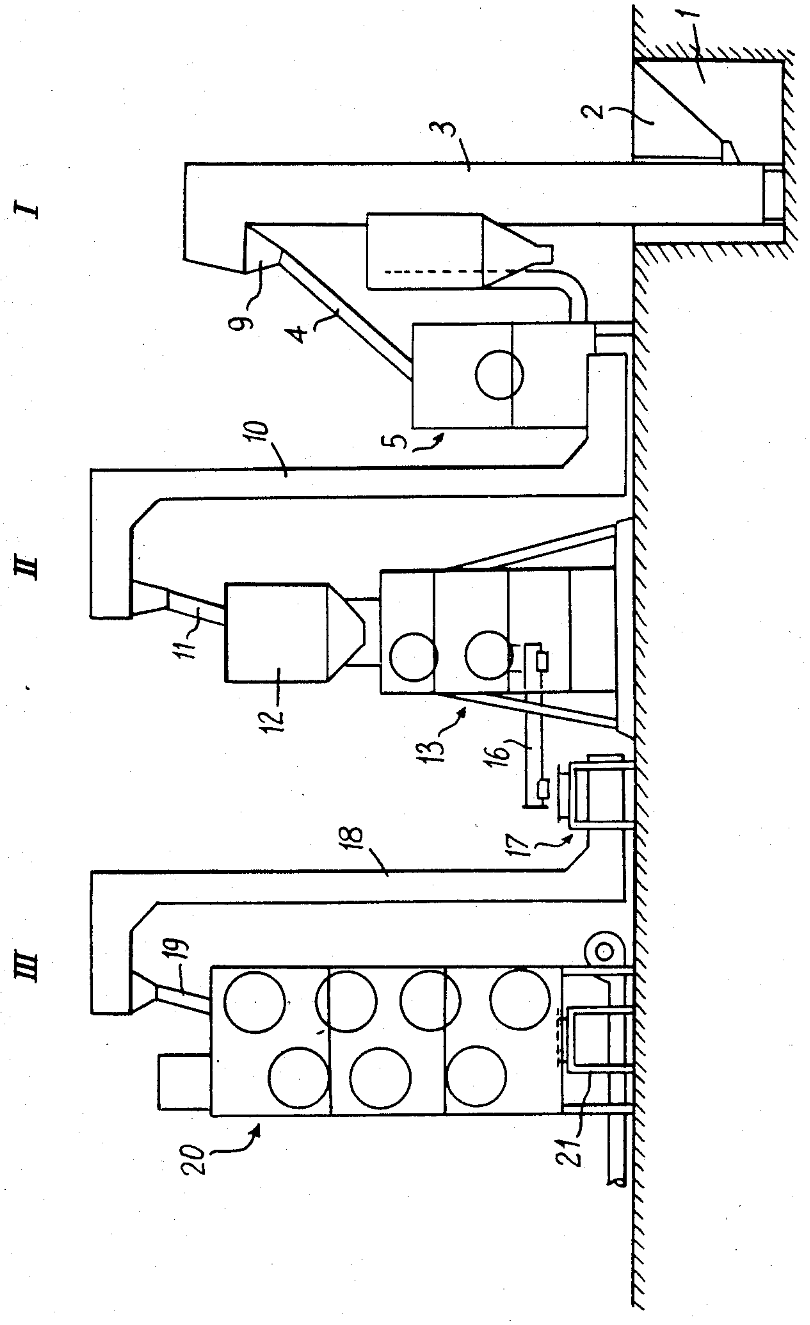
FIG. 4 is a general view of the installation.

Said flow is taken over by a bucket elevator 18 (FIG. 3, section III) in order to be discharged via a chute 19 in a drying assembly denoted as a whole by reference numeral 20.

Said drying assembly is formed of seven ovens 20-A to 20-G including all a drum with a rotative arm, similar to drums 7, 14 and 15. The drying oven 20-A is formed of a single drum, meaning that it is made of a cylindrical envelope through which extends a rotative axial shaft carrying a plurality of radiating arms. The other drying ovens 20-B to 20-G include double cylindrical envelopes and in the cylindrical space thus defined between said two envelopes flows water steam at about 200°-250° C. The first drum 20-A comprises means for injecting steam to the mass of stirred seeds so as to bring the degree of humiditity—which is less than 15%—up to about 16% to 18%. There is no heating by the wall in this drum but only a heating and complementary humidification by steam injection. On the contrary, drums 20-B to 20-G are heated by the steam flowing in their double wall but have no steam injection. The temperature prevailing in drum 20-B is of about 70° C. and increases progressively for reaching about 95° C. in the last drum 20-G; said temperature having to be less than 100° C.

At the oulet of the last drum 20-G, the kernels contain less than 1% of humidity and are ready for consumption or the preparation of sesame oil; all the husk debris still sticking to the kernels when introduced in device 20 are detached and completely dryed out, so that they can be easily eliminated by any ventilation sieving of known type 21.

The various sesame seed husk debris which are collected carry only 15% of humidity for some of them and less than 1% for the others, and they can be used as animal feed without any further treatment.

I claim:

1. A method for husking sesame seeds and preparing them for the production of oil and consumption, wherein the husking is carried out in two stages wherein:

first, the seeds are introduced to an attrition apparatus while injecting water and a water steam mixture until the water content of said seeds is about 15% and then sieving said seeds at the outlet of said attrition apparatus; and then, during a second stage, the seeds are introduced into a drying assembly, where at the inlet of said drying assembly they receive a complementary water steam injection bringing their water content between 16% and 18%, the seeds are then dried in an attrition apparatus, thereby loosening the husk debris sticking to the sesame seeds.

2. A method according to claim 1, comprising introducing sesame seeds, which have been previously freed from their impurities, in an attrition apparatus while proceeding to simultaneous water and water steam injection in a proportion such that the water content of the seeds is about 15%, thereby causing a swelling of the seeds and a first separation of the husk such that the husking operation is carried out to at least 95% completion, then, after sieving said seeds, introducing the seeds thus almost completely husked into a drying assembly at the inlet of said drying assembly they receive a complementary injection of water steam so that their water content is 14% to 18%, the drying operation being carried out for 1.5. hours to 2 hours at a temperature between 120° C. and 130° C.; so that at the outlet of the drying apparatus the husk remnants are separated from the kernels and desiccated; said husk remnants then being further separated from the kernels by sieving, the kernels being ready for consumption and/or the production of sesame oil.

3. A method according to claim 2, wherein the sesame seeds are previously freed from their impurities by mechanical means before the first treatment stage.

* * * * *

UNITED STATES PATENT AND TRADEMARK OFFICE
CERTIFICATE OF CORRECTION

PATENT NO. : 4,693,903

DATED : September 15, 1987

INVENTOR(S) : Mohammed HALWANI

It is certified that error appears in the above-identified patent and that said Letters Patent are hereby corrected as shown below:

Title page:

Item [19] reading "Halvani" should read --Halwani--.

Signed and Sealed this

Fifteenth Day of December, 1987

*Attest:*

DONALD J. QUIGG

*Attesting Officer*

*Commissioner of Patents and Trademarks*